No. 809,476. PATENTED JAN. 9, 1906.
P. M. THAYER.
WEED PULLER.
APPLICATION FILED JULY 25, 1904.
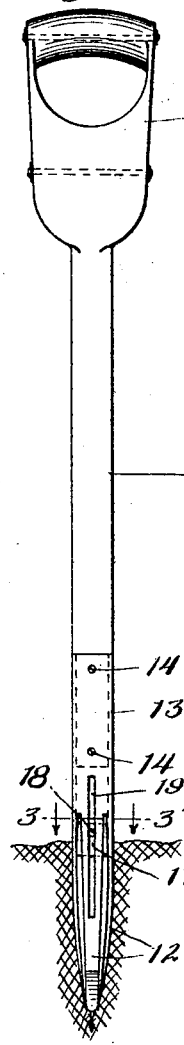
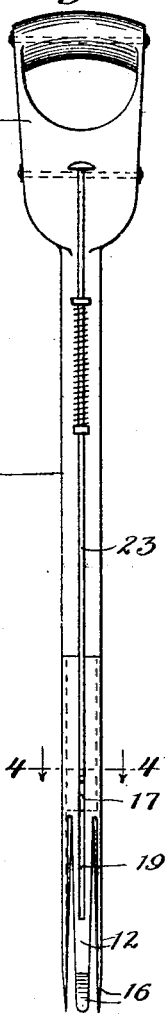
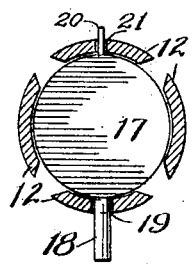
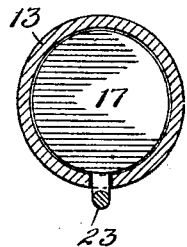
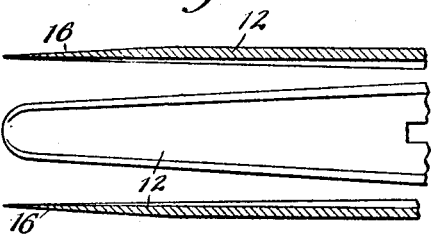
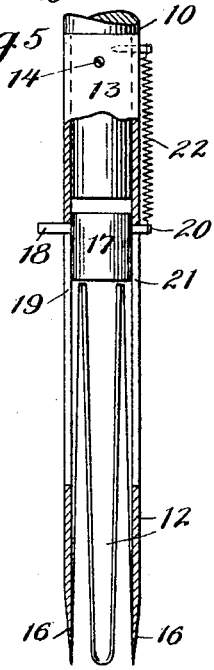
Witnesses:
Wm. Geiger
H. W. Munday
Inventor
Paul M. Thayer
By Munday, Evarts & Adcock
Attorneys

UNITED STATES PATENT OFFICE.

PAUL MUNSON THAYER, OF PLYMOUTH, INDIANA.

WEED-PULLER.

No. 809,476.

Specification of Letters Patent.

Patented Jan. 9, 1906.

Application filed July 25, 1904. Serial No. 217,906.

*To all whom it may concern:*

Be it known that I, PAUL MUNSON THAYER, a citizen of the United States, residing in Plymouth, in the county of Marshall and State of Indiana, have invented a new and useful Improvement in Weed-Pullers, of which the following is a specification.

This invention relates to devices for pulling weeds; and its object has been to devise a practical and inexpensive hand implement adapted to that purpose.

The invention is provided with a handle, preferably about the length of and corresponding in construction to the ordinary shovel-handle, and at its lower end the handle carries a plurality of pointed knives, which are preferably arranged in a circle and are adapted to be entered to the necessary depth in the earth in proximity to the weed by pressure upon the handle. The knives are also adapted to be turned after insertion, so as to sever the earth all around the weed and to cut the laterally-extending roots. The knives are further adapted to lift out the weed when they are withdrawn, and in order that they may do this with certainty I not only arrange the knives so they will act upon opposite sides of the plant, but I also make them of spring metal and bevel them on their exterior surfaces, so that the earth will tend to press their points toward the axis of the circle as they enter, thus reducing the area within the points of the knives and enabling them to exert the pull upon the weed necessary to effect its removal. The knives, it should be further stated, are sharpened along their vertical edges, so that when the implement is turned they may readily cut their way through the roots and surrounding earth. I also provide the implement with a device for ejecting the weed and the earth taken up with it from between the knives. The device is also well adapted to be used in transplanting.

The nature of my invention will be better understood from the accompanying drawings, forming a part thereof, when considered in connection with the following description.

In said drawings, Figure 1 is an elevation of my improved weed-pulling implement. Fig. 2 is a similar view showing a modified construction. Fig. 3 is a section on the line 3 3 of Fig. 1. Fig. 4 is a section on line 4 4 of Fig. 2. Figs. 5 and 6 are partial enlarged vertical sections taken at right angles to each other.

In said drawings, 10 represents the handle of the implement, provided with a hand-grasp 11 at its upper end, the two resembling the handle of a shovel or spade as ordinarily constructed. At the bottom of the handle are a series of knives 12, attached to the handle in any suitable manner. As shown, they are formed in one piece with a ring or tube 13, which is secured to the handle by screws 14. The knives are made of a length sufficient to enable them to enter the earth to a depth equaling the depth to which the weeds to be pulled usually grow, and they are arranged around the handle so as to form a circle adapted to surround the weed or the main trunk or stem thereof. The knives are made sharp not only at their points, but their vertical edges are also sharpened, as seen at Fig. 3, so that they may readily enter the ground and sever the earth surrounding the weed and its laterally-extending roots and so that they may, when the handle is turned axially, complete any severing not accomplished by the entering movement. I have shown four of the knives in the drawings, and they are preferably bent to conform to the circle which they practically describe and arranged with pairs of them at opposite sides of the circle; but I do not wish to be limited to this number nor to any specific number; nor do I wish to be limited to the arrangement stated except in so far as such arrangement may be necessary to enable the implement to extract the weed after it has been severed from its surrounding earth and roots. Although the knives as arranged in the opposite manner, as shown, are well adapted to bring the weed up with them when they are withdrawn from the ground, I prefer to so construct them as to insure that result, and to this end I make them of metal capable of some spring action and bevel off the outer sides of their points, as seen at 16, Figs. 5 and 6, so that as they enter the ground the earth will press their points convergingly, as particularly shown at Fig. 1. In consequence of this convergence, when the implement is withdrawn the points being partly under the severed weed will bring the latter up with themselves and retain the control thereof so long as may be necessary. As the extracted weeds may not drop out of the implement as freely as desired, I also provide an ejecting device 17, which may be depressed by the foot or by the hand, and thus eject the weed. In Figs. 1 and 5 it is shown as adapted to be operated by the foot, having a pin 18 at one side projecting through the slot 19, formed partly in the tube 13 and partly in one of the knives, as shown, a guide-pin 20 on the side opposite the pin 18 and working in a slot 21 similar to the slot 19, and a retracting-spring 22, attached to pin 20, the pin 18 projecting far enough outside to permit it to be engaged by the foot of the person using the implement. Of course this pin is normally positioned far enough above the knives to be out of the way when inserting the implement in the ground. In the construction shown at Fig. 2 the ejector is connected to a rod 23, extending upward into the neighborhood of the hand-grasp, so that the user may conveniently operate it by hand. The retracting-spring may be applied to the rod 23, as illustrated.

The mode of operation of the device has been already fully explained and needs no further description.

While the construction shown is deemed a desirable one, it will be understood that I do not wish to be limited thereto, as obviously the details of construction may be considerably varied without departing from my invention.

In order that the implement may not remove any more of the earth immediately surrounding the weed than is necessary, the circle formed by the knives or cut by them when the implement is turned is made small; but the implement may be made so as to sever the earth at different distances from the center of the plant, if desired.

I claim—

1. The weed-puller consisting of a handle and a series of pointed sharp-edged knives attached thereto and made of spring metal so as to adapt them to yield convergingly when pressed into the ground.

2. The implement herein described, consisting of a handle and a series of pointed and sharp-edged knives arranged in a small circle around the bottom of the handle, the implement being adapted to insert the knives in the ground and to be turned after insertion so as to effect a clean severation of the surrounding dirt and lateral roots and enable the easy extraction of the weed.

PAUL MUNSON THAYER.

Witnesses:
GEORGE H. THAYER, Jr.,
MARY L. M. THAYER.